June 24, 1958 E. BOK ET AL 2,840,681
EVAPORATING DEVICES
Filed March 13, 1957 3 Sheets-Sheet 2

United States Patent Office 2,840,681
Patented June 24, 1958

2,840,681

EVAPORATING DEVICES

Edward Bok and Hendrik Frederik Bok,
Amsterdam, Netherlands

Application March 13, 1957, Serial No. 645,814

Claims priority, application Netherlands March 24, 1956

2 Claims. (Cl. 219—38)

The invention relates to an evaporating device, in particular for producing a pressure medium for a spray painting apparatus, comprising a pressure vessel in which an electric heating element is arranged and in which a liquid in particular a volatile liquid such as a hydrocarbon is evaporated.

It is an object of the invention to provide an evaporating device wherein a vapour jet of practically constant temperature adapted to be used as a pressure medium in a spray painting apparatus may be developed in a relatively small space.

Another object of the invention is to provide a vapour jet of large capacity which may be produced in a simple manner by means of a simple compact and easily transportable apparatus.

In our Patent No. 2,790,063 an evaporating device has been described in which an evaporating chamber is formed by the heating element and an envelope surrounding the same, this evaporating chamber being provided with a liquid inlet and a vapour outlet and the liquid in the evaporating chamber being in direct contact with the conductive heating surface.

In producing a pressure medium for a spray painting apparatus by means of an evaporating device of the above type it is of great importance in order to obtain good spraying results, that a vapour of substantially constant temperature is developed.

If the hydrocarbon vapour developed in the evaporating device is heated to too high a temperature, there is a danger, that the vapour will be decomposed whereby coke-like substances are formed. This will lead to the deposition of carbon f. i. in the spray gun and in the connecting tube leading to the same, whereby the reliability of the spray painting apparatus will be seriously prejudiced. Too low a temperature of the pressure medium would also involve serious disadvantages, as the paint, which should be preheated by the vapour, would not obtain the required fluidity in this case. Moreover, a low vapour temperature may lead to condensation in the connecting tube and the spray gun, whereby the spraying is impeded and the efficiency of the apparatus is decreased.

Hence, it is a further object of the invention, to remove this disadvantage by providing the device with liquid level control means stabilizing the liquid level in the evaporating chamber.

The heat supplied by the heating element is used for evaporating the liquid, and for superheating the vapour which has been developed. The liquid level in the heating chamber determines the ratio between the parts of the heating surface that are in contact with the liquid and the vapour, respectively, i. e. the ratio between the amounts of heat supplied to the liquid and to the vapour.

For instance, if the liquid level in the heating chamber is lowered, this will not only lead to a reduction of the amount of liquid which is evaporated per time unit, but also to an increase of the amount of heat supplied to the vapour per time unit, so that the temperature of the vapour increases. On the other hand, a higher liquid level will lead to a decrease of the vapour temperature.

Now, if the liquid is kept at a constant level by means of the liquid level control, a constant vapour volume will be formed, and the amount of heat supplied to the vapour will likewise be constant, as the same part of the heating element is always in contact with the vapour in order to superheat the same. Thus, the vapour developed in the device will always have the same temperature, so that it is very suitable to be used as a pressure medium in a spray painting apparatus.

According to the invention the evaporating chamber is connected with a liquid supply tank through a liquid supply opening and through a pressure equalising channel which discharges into the liquid supply tank above the highest liquid level, so that its junction with the evaporating chamber determines a plane of stabilisation of the liquid level in the evaporating chamber.

In this manner, a constant liquid level in the evaporating chamber is obtained by very simple means. The liquid level will be stabilised substantially at the level of the junction of the equalising channel with the evaporating chamber; as soon as the liquid level is lowered, even to a very small extent, vapour will escape to the vapour space in the liquid supply tank, whereby a further decline of the liquid level is prevented.

On the other hand, if the liquid level in the evaporating chamber has a tendency to rise due to a pressure decrease in the vapour space, for instance when the spray gun is opened, vapour will flow from the liquid supply tank to the evaporating chamber so as to reestablish the equilibrium. Thus, the plane of stabilisation of the liquid level is determined by the junction with the equalising channel, and the stabilisation is effected by the communication between the evaporating chamber and the liquid supply tank.

In a preferred embodiment of the invention the equalising channel extends through the liquid supply tank and is provided with a liquid inlet opening within said tank.

In this manner the equalising channel may be used for the liquid supply from the liquid supply tank to the evaporating chamber. For this purpose the liquid inlet opening is dimensioned in such manner that the liquid flow to the evaporating chamber is amply sufficient to replace the vapour which is removed, but that this flow may never increase to such a degree that this would cause a considerable rise of the liquid level during a sudden decrease of pressure in the evaporating chamber.

Further the arrangement of a part of the equalising channel within the liquid supply tank provides a heat transfer from the return flow of liquid or vapour from the evaporating chamber to the liquid supply tank for preheating the liquid in the liquid supply tank.

Therefore less evaporating heat will be needed for evaporating this liquid when the liquid is fed to the evaporating chamber in a later stage.

In order to increase the heat transfer effect the part of the equalising channel extending through the liquid supply tank has an increased heat transfer surface exposed to the liquid.

In a suitable embodiment of the invention, the electric heating element within the evaporating chamber consists of a band bent in zig-zag fashion, and made of a metal having a relatively low electric resistance, such as chromium steel, which band is exposed to the liquid on both sides.

By making use of a band-shaped heating element, which is in direct contact with the liquid on both sides, a very large heat transfer surface is obtained. Due to the zig-zag shape of the band, its dimensions are such that the band may be accommodated in a relatively small space.

The use of a chromium steel band, which is much cheaper than the usual electric resistance elements consisting, for instance, of chromium nickel steel, does not only lead to a reduction of costs, but also allows for developing in the heating band the power of 3000 watts required for obtaining a sufficient evaporating capacity by means of the usual voltage of 220 volts, while maintaining the required low temperature of the band.

In order to ensure a compact construction, the metal band may be helically wound on a core of insulating material, and bent in zig-zag fashion in such manner that the axis of the core is in parallel with the substantially radial alternating parts of the band, while successive windings of the band are insulated with respect to each other.

The invention will be more fully explained by reference to the accompanying drawings, wherein.

Figure 1:
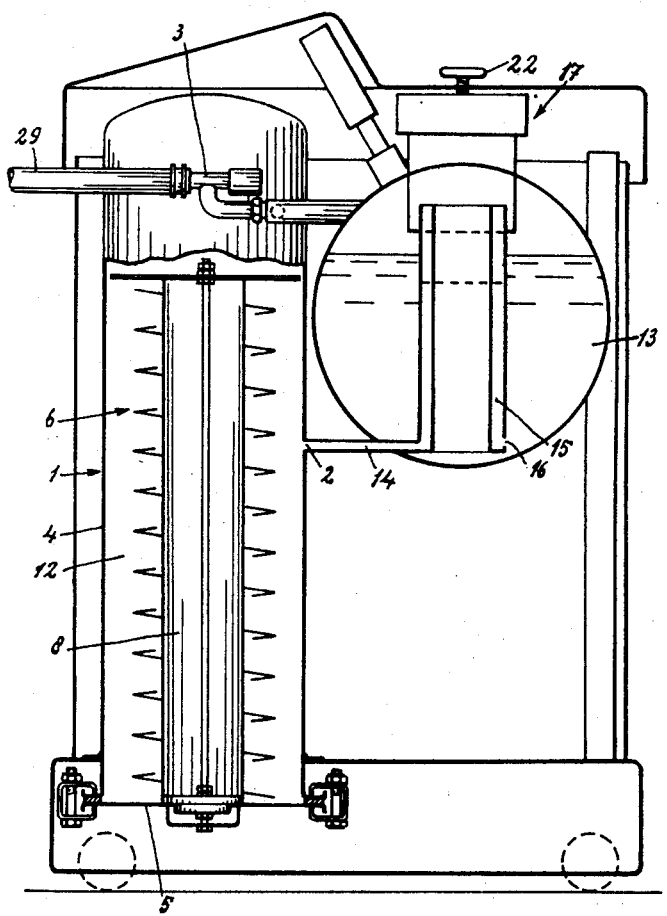
Fig. 1 is a longitudinal section of an evaporating device according to the invention.

Fig. 1 shows an evaporating device according to the invention, in which the liquid level in the evaporating chamber is substantially stabilized, so that a vapour of constant temperature will be obtained. Such a device may serve to evaporate a volatile liquid, for instance a hydrocarbon, having a short and low boiling range, such as petroleum ether, and the vapours developed thereby may serve as a pressure medium in a spray painting device, in particular for hot spray painting. During the spraying of the paint, the saturated heated gaseous medium will form a protecting cover which prevents the diluting agent from being withdrawn from the paint. The device comprises a pressure vessel 1 (Figs. 1 and 2) having a liquid supply opening 2 and a vapour outlet opening 3.

Figure 2:
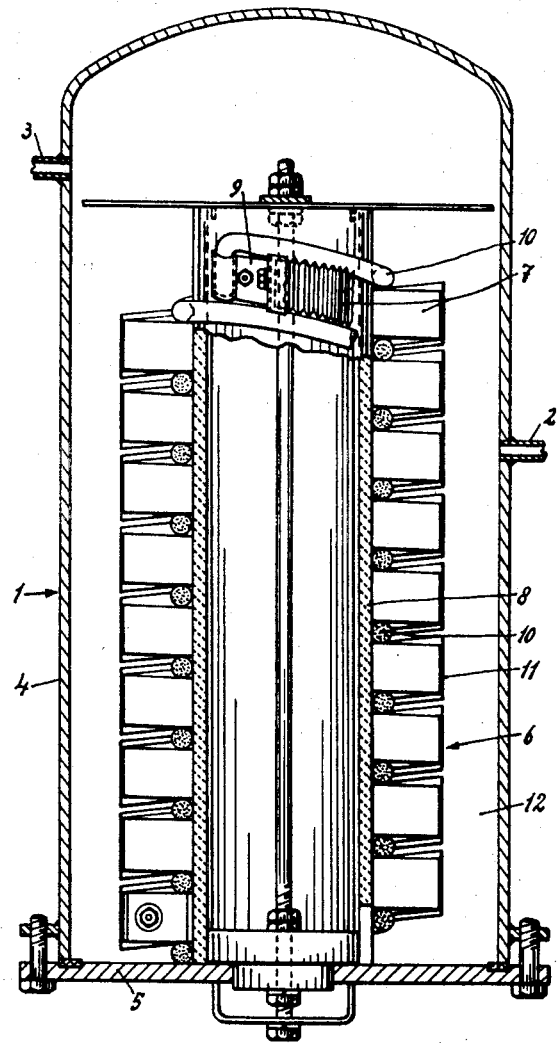
Fig. 2 is a longitudinal section of the evaporating chamber and the heating element of a device according to the invention.

The pressure vessel 1 comprises a housing 4, which is closed at the upper side and a bottom plate 5. The housing 4 and the bottom plate 5 are connected to each other in a pressure tight manner; such a connection may be realized in several ways. Two different constructions for this purpose are shown in Figs. 1 and 2.

The electric heating element 6 consists of a metal resistance band 7 which is bent in a zig-zag fashion and which is helically wound on a core 8 made of an insulating material and attached to the bottom plate 5, whereby both sides of the band 7 are in direct contact with the liquid and with the vapour. Preferably, the electric resistance band 7 is made of a metal with a relatively high electric conductivity, such as chromium steel or the like.

Fastening clips 9 are fitted to the upper and the lower part of the circumferential surface of the isolating core 8 for securing the ends of the electric resistance band 7 and of a continuous string 10 of flexible insulating material such as asbestos fibres, which is provided between successive windings of the resistance band 7.

Each of the fastening clips 9 is connected to the electric circuit via a pressure tight bushing in the wall of the pressure vessel. The fastening clips 9 are electrically connected to each other by means of the resistance band 7 so that an electric current may pass through this band 7 in order to heat the liquid within the pressure vessel 1.

A clamping band 11 of insulating material such as asbestos fibres or the like is wound around the resistance band 7 in order to prevent loosening of the band 7. The ends of the clamping band 11 are connected to the fastening clips 9.

In the pressure vessel 1, an evaporating chamber 12 is formed, to which liquid is supplied from a liquid supply tank 13 via a channel 14 and wherein the liquid comes into direct contact with both sides of the electric resistance band 7. The junction of the channel 14 with the evaporating chamber 12 defines the practically constant liquid level in the evaporating chamber 12 during the evaporation, as will be explained hereinafter. This constant liquid level is necessary for obtaining a vapour of constant temperature which is extremely suitable for spray painting purposes.

In the liquid supply tank 13, the conduit 14 passes into a heat exchanger 15, which consists of a double walled tube exposed to the liquid in the liquid supply tank 13 both with its outer and inner surfaces, whilst the heat exchanger 15 has an open end placed above the highest liquid level in the liquid supply tank 13.

In the lower part of the liquid supply tank 13, the heat exchanger 15 has a relatively small opening 16, through which the liquid from the liquid supply tank 13 may flow through the channel 14 into the evaporating chamber 12.

The channel 14 connects the evaporating chamber 12 with the vapour space in the liquid supply tank 13, so that two communicating spaces are formed and the vapour in the liquid supply tank 13 will obtain approximately the same pressure as the vapour in the evaporating chamber 12. Therefore the channel 14 also functions as a pressure equalising channel. When the vapour pressure in the evaporating chamber 12 increases, f. i. when temporarily less vapour is removed, the liquid level in the evaporating chamber 12 decreases and as soon as the junction with the channel 14 has been reached, vapour escapes to the liquid supply tank 13 and partly condenses therein so that a further decline of the liquid level in the evaporating chamber 12 is prevented.

If on the other hand, the pressure in the evaporating chamber 12 decreases, f. i. when the spray gun is opened, vapour from the liquid supply tank 13 flows back to the evaporating chamber 12 and reestablishes the equilibrium.

In this way, the liquid level is prevented from rising as a result of an increased liquid supply from the liquid supply tank 13 through the opening 16, and this rise is further opposed as the opening 16 is dimensioned in such manner, that the liquid flow to the evaporating chamber 12 is amply sufficient to replace the vapour which is removed, but that this flow may never increase to such a degree that this would cause a considerable rise of the liquid level during a sudden decrease of pressure in the evaporating chamber 12.

The object of the heat exchanger 15 is to use the heat of the return flow of liquid or vapour from the evaporating chamber 12 to the liquid supply tank 13 for preheating the liquid in the liquid supply tank 13.

A pressure switch 17 is arranged through an opening in the liquid supply tank 13 and controls the electric current supply to the electric resistance band 7 in such manner, that the vapour pressure in the liquid supply tank 13 is maintained at a predetermined value.

For this purpose, the pressure switch 17 comprises a pressure surface 18 (Fig. 4) which is connected to the housing 20 by means of compressible bellows 19. At one side of this pressure surface 18, the vapour pressure prevails, whilst a spring 21 exerts a pressure on the other side of the pressure surface 18; this spring pressure may be adjusted by means of an operating member 22. The pressure surface 18 is connected with a ferromagnetic switch blade 23 of an electric switch 24. The blade 23 is pivotally supported at 25 and placed with its free end between two permanent or permanently excited magnets 26, 27 which are arranged with poles of the same sign opposite to each other, so that the blade 23 may be attracted by either of them.

When the vapour pressure increases to such an extent that the pressure of spring 21 and the attraction force of magnet 27 are surmounted, the pressure surface is displaced, whereby the switch blade 23 is released from the magnet 27 and brought into the field of the opposite magnet 26 and the current supply to the resistance band 7 is switched off as the switch blade 23 and the magnet 27 serve as contacts of the switch 24, indirectly controlling the current supply to the electric resistance band 7.

On the other hand, the switch blade 23 switches back to its extreme position against magnet 27 when the vapour pressure decreases below a certain predetermined value, whereby the current supply to the heating band 7 is resumed. Due to the application of the magnets 26 and 27 two very stable extreme switching positions are obtained so that the occurrence of unstable intermediate positions and of vibrations of the switch blade is prevented. Preferably, a resilient switch blade 23 is used, whilst the switch blade 23 and the magnets 26 and 27 are so dimensioned that the force of attraction exerted on the switch blade 23 by either of the magnets is not overcome until the switch blade 23 has been bent to such an extent that the switch blade is still bent to a lesser degree but in the same sense after its displacement to the other magnet.

Figure 4:
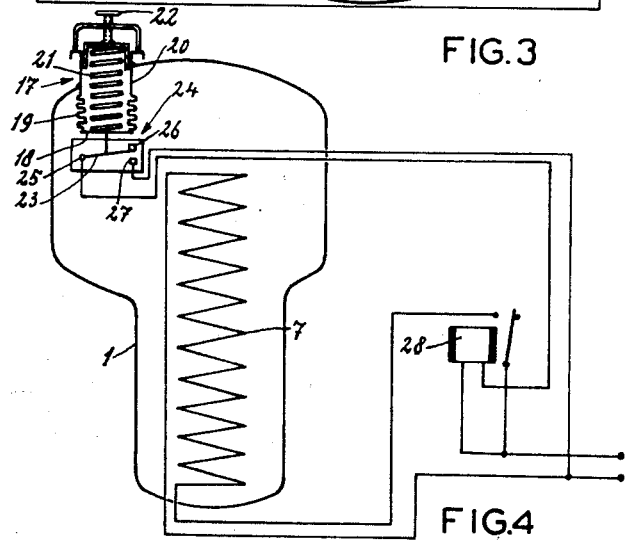
Fig. 4 shows a circuit arrangement for the heating element, comprising a pressure switch for controlling the vapour pressure.

As shown in Fig. 4, the switch 17 carries a control current and controls a relay 28, which is placed outside the pressure vessel and which controls the main current supply to the resistance band 7.

The pressure in the evaporating chamber 12, which represents the spraying pressure, is practically equal to the vapour pressure in the liquid supply tank 13, as both spaces communicate with each other and the difference between the liquid levels is only of secondary importance.

As soon as the pressure in the evaporating chamber 12 increases beyond the desired spraying pressure, the vapour pressure in the liquid supply vessel 13 incerases and operates the pressure switch 17 which switches off the current supply to the resistance element 17, until the pressure in the evaporating chamber 12 has been decreased to a predetermined value. By means of the operating member 22, the spraying pressure may be adjusted or varied in a very easy manner.

The starting of the evaporating device according to Fig. 1 is performed as follows:

When the device is out of service and the current supply is switched off independently of the pressure in the liquid supply tank 13 and the evaporating chamber 12, both the liquid and the vapour have the room temperature, so that practically no vapour is present. Thus the liquid level in the evaporating chamber 12 lies considerably above the working level. When starting the device the operating member 22 of the pressure switch 17 is adjusted in such manner that the electric current to the heating element 7 is not switched off before the maximum working pressure has been obtained.

During this period, a shut off valve for the flexible hose 29 is closed, so that the developed vapour in the evaporating chamber 12 is not removed through the hose 29 and the pressure increases in an accelerated manner.

When vapour under pressure is formed within the evaporating chamber 12, the liquid level in the evaporating chamber 12 declines until the junction with the channel 14 has been reached, whereupon the vapour may escape to the vapour space within the liquid supply tank 13 and may partially condense.

Further the liquid level in the evaporating chamber 12 will fluctuate only to a limited extent with respect to the junction of the channel 14, as vapour will escape from the evaporating chamber 12 to the liquid supply tank 13, when the liquid level declines to this junction, and the liquid temperature in the supply tank 13 will be increased by means of the intensified heat transfer via the heat exchanger 15, so that the vapour pressure in the liquid supply tank 15 increases too.

As soon as this pressure in the liquid supply vessel 13 has reached the maximum working pressure, the pressure switch 17 switches off the current to the electric resistance band 7.

Then the paint spraying apparatus may be put in operation and the pressure switch 17 may be adjusted by means of the operating member 22 so that vapour of the desired spraying pressure is formed, whilst the shut off valve of the hose 29 is opened, so that vapour may flow from the evaporating chamber 12 through the flexible hose 29 to the spray gun. After the spray gun has been started, vapour flows away through the spraying nozzle and the vapour pressure in the evaporating chamber 12 decreases, whereupon vapour from the liquid supply tank 13 flows to the evaporating chamber 12. As soon as the vapour pressure in the liquid supply tank 13 has been decreased to the predetermined switch-on pressure, the pressure switch 17 operates and switches on the current supply to the resistance band 7.

The device is now stabilised, and the liquid level only fluctuates to a limited extent with respect to the junction with the channel 14 and will thus be maintained at a substantially constant value, so that vapour of a constant temperature is formed.

Figure 3:
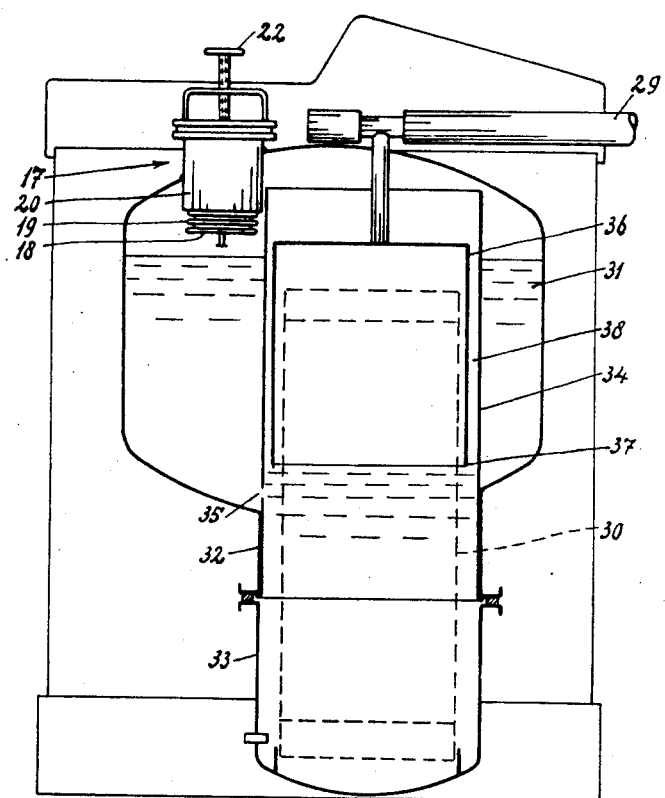
Fig. 3 is a longitudinal section of a modified embodiment of the invention.

Fig. 3 shows a modified embodiment of the evaporating device according to the invention, in which the evaporating chamber 30 is positioned within the liquid supply tank 31, so that the total dimensions of the apparatus may be considerably reduced and an improved heat transfer to the liquid supply may be obtained.

The common pressure vessel has a cylindrical top part 31 and a narrower cylindrical bottom part 32 having a detachable bottom 33 connected thereto in a pressure tight manner. A cylindrical partition wall or sleeve 34 is positioned within the liquid supply vessel 31 which forms the wall of the evaporating chamber 30 and abuts against the narrower part 32 of the pressure vessel.

The sleeve 34 which is open at its top and bottom, is provided with an opening of small dimensions, which connects the space within the sleeve 34 with the liquid supply tank 31.

A resistance element, which may have the same construction as the resistance element according to Figs. 1 and 2 is connected to the bottom 33.

A pressure switch 17 is arranged in the upper side of the tank 31. The tube or hose 29, which is provided with a shut off valve is connected to a superheating cap 36, which forms the vapour space within which the vapour is superheated.

In operation, a heat transfer to the liquid in the liquid supply tank 31 will occur, as the evaporating chamber 30 and the liquid supply vessel 31 are only separated by the thin sleeve 34, so that the whole cylindrical inner wall 34 of the liquid supply tank 31 acts as a heat transfer surface. Consequently, the liquid in the liquid supply tank 31 will be heated to practically the same temperature as the liquid in the evaporating chamber 30.

Although the starting time of the installation is somewhat extended, the evaporation during the working period is considerably accelerated due to the increased temperature of the liquid supply, whilst the vapour pressure in the liquid supply tank remains more stable as less condensation occurs.

When the device has been started, the liquid level in the superheating cap 36 declines until the under edge 37 of the cap 36 has been reached, whereupon the vapour may escape to the vapour space within the liquid supply tank 31 through the circular equalising channel 38 between the sleeve 34 and the cap 36 and will partly condense so that a further heat transfer will take place.

Thereupon the liquid level in the cap 36 rises somewhat with respect to the under edge 37 of the cap 36, so that the vapour flow through the channel 38 is interrupted. Then the vapour pressure in the cap 36 drives out the liquid again, until the liquid level has dropped to the under edge of the superheating cap 36, whereupon the vapour flow through the equalising channel 38 starts again.

As soon as the vapour pressure in the liquid supply tank 31 has reached the maximum working pressure, the pressure switch 17 operates and the current supply to the electric heating element 7 is switched off. Then the spray painting apparatus may be put in operation and the liquid level will be practically maintained at the level of the under edge of the superheating cap 36 due to the communicating action between both vapour spaces. In this manner a constant liquid level is obtained so that a vapour of constant temperature is formed.

Various other modifications of the construction and the arrangement may obviously be resorted to without departing from the spirit and scope of the invention.

We claim:

1. A device for evaporating a volatile liquid comprising an evaporating chamber, an electric heating element in said evaporating chamber, a supply tank for said liquid, and a pressure equalizing channel connecting said evaporating chamber with the upper part of said supply tank and extending through the same, a liquid supply opening having a smaller cross section than said pressure equalizing channel being provided in the wall of the same in the lower part of said supply tank, the part of said pressure equalizing channel contained within said supply tank including an enlarged heat transfer surface exposed to the liquid in said supply tank.

2. A device for evaporating a volatile liquid, comprising an evaporating chamber, an electric heating element in said evaporating chamber, a supply tank for said liquid, a pair of spaced coaxial cylinders within said supply tank confining an annular space, and a pressure equalizing channel connecting said evaporating chamber with the upper part of said supply tank and extending through the annular space between the said coaxial cylinders, a liquid supply opening having a smaller cross section than said pressure equalizing channel being provided in the wall of the same in the lower part of said supply tank.

References Cited in the file of this patent

UNITED STATES PATENTS

| | | |
|---|---|---|
| 1,238,124 | Frickey | Aug. 28, 1917 |
| 2,453,455 | Persak | Nov. 9, 1948 |
| 2,478,569 | Cooper | Aug. 9, 1949 |